D. C. Cooley,
Churn.
No. 87,147.
Patented Feb. 23, 1869.
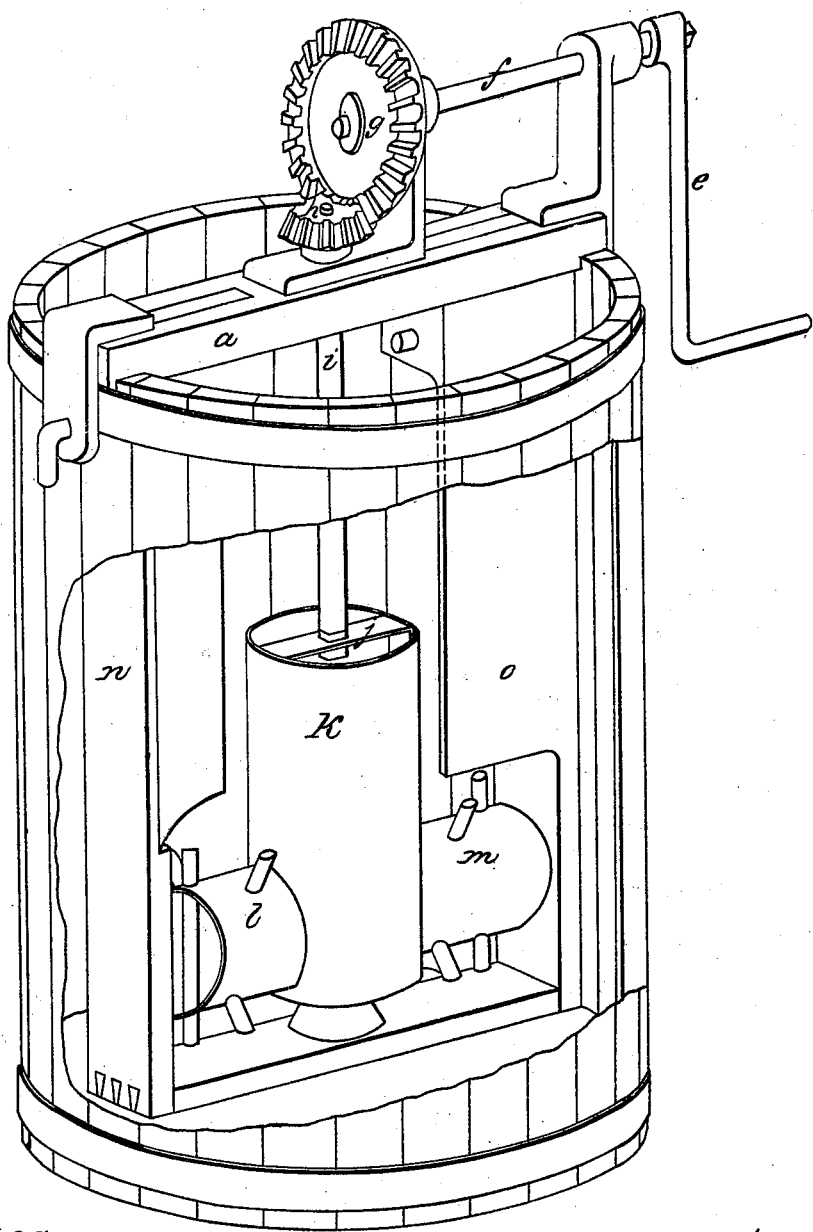
Witnesses:
R. H. Dunlap
C. W. Spayd
Inventor:
DeWitt C. Cooley

DE WITT C. COOLEY, OF WILKESBARRE, PENNSYLVANIA.

Letters Patent No. 87,147, dated February 23, 1869.

IMPROVEMENT IN CHURNS.

The Schedule referred to in these Letters Patent and making part of the same.

*To all whom it may concern:*

Be it known that I, DE WITT C. COOLEY, of the borough of Wilkesbarre, county of Luzerne, and State of Pennsylvania, have invented a new and useful Improvement on the Churn or Machine for Making Butter to be called "The Centrifugal Churn;" and I do hereby declare that the following is a full, clear, and exact description of the construction and operation of the same, reference being had to the drawings now on file, and the amended drawings herewith filed, making a part of this amended specification, in which—

Figure 1 is a perspective view of the entire machine with the sides of the churn broken away so as to show the construction and arrangement of the breakers and hollow dasher, with arms and pins.

I construct the said improved churn in the manner following, to wit:

On the cross-bar $a$, attached to the top of the cylindrical vessel, fig. 1, is fixed the crank $e$, shaft $f$, and bevel-gearing $g\ h$, by which the vertically-descending shaft $i$ is made to revolve.

Attached to the shaft $i$, by means of the cross-bar $j$, is the hollow dasher K, with arms provided with pins, the same being a hollow cylinder, closed at bottom but open at top, and into and through two or more hollow arms $l\ m$, projecting at right angles to the main vertical cylinder, and furnished with pins passing transversely through said arms, and projecting above and below the same.

The said hollow dasher and arms, if constructed of wood, may be quadrangular in shape, that being the cheapest and most convenient form of construction with that material.

Adjusted and fixed to cross-bar $a$, are two breakers, $n\ o$, reaching down at the inner sides of the vessel, fig. 1, but cut away, so as only to leave space sufficient at the bottom for the arms $l\ m$, with pins, to revolve, the said breakers being made scroll-shaped, that is, hollowed on one side, and the fluted or hollowed sides placed reverse to each other, with the outer side edges elevated or projecting from the arms to which they are affixed, so that said breakers shall not only serve to check or break the revolving current, but also to turn and direct such current into the hollow dasher.

The said breakers are connected together at the bottom by means of a cross-bar, $p$, which holds them steady and firm, and serves as a rest and socket, in which said dasher rotates, on a pivot at the bottom thereof.

The said improved churn is operated and effects the making of butter as follows:

The vessel, fig. 1, being filled with milk or cream to a level above the top of the hollow dasher K by means of the crank and bevel-gearing aforesaid, the dasher is made to revolve in a direction towards the hollowed sides of the breakers, so that, by means of centrifugal force, the milk is thrown from the arms of the dasher against the sides of the churn, and falling into the revolving current caused by the revolving dasher, arms, and pins, is thrown against the hollowed sides of the breakers, and not only checked, but also directed and turned into the hollow dasher, whereby a constant stream is made to flow down through the hollow dasher, and arms, and inserted pins, with a velocity commensurate to the force applied, thus perfectly aerifying, and, in combination with the action of the arms and pins, agitating the milk or cream, for the purpose of making butter.

I disclaim the invention of any part of said improved churn, or of the appliances or appurtenances thereunto belonging, as the same is herein described, except the application and use of the hollow dasher, with arms provided with pins, and the scroll-shaped breakers, in combination with said dasher, for the purposes herein set forth and particularly claimed.

What I claim as my invention, and desire to secure by Letters Patent, is as follows:

1. The hollow dasher K, with arms $l\ m$, provided with pins, as shown, for the purpose of making butter.

2. The scroll-shaped or hollowed breakers, in combination with said hollow dasher, for the purposes of not only breaking the revolving current of milk or cream being churned, but also to direct and turn the same into said hollow dasher, all being substantially constructed, and operated, and used for the purposes hereinbefore set forth.

DE WITT C. COOLEY.

Witnesses:
R. H. DUNLAP,
C. W. SPAYD.